June 5, 1962 H. T. WATKINS 3,037,394
V-BELT DRIVE
Filed Feb. 23, 1960 2 Sheets-Sheet 1
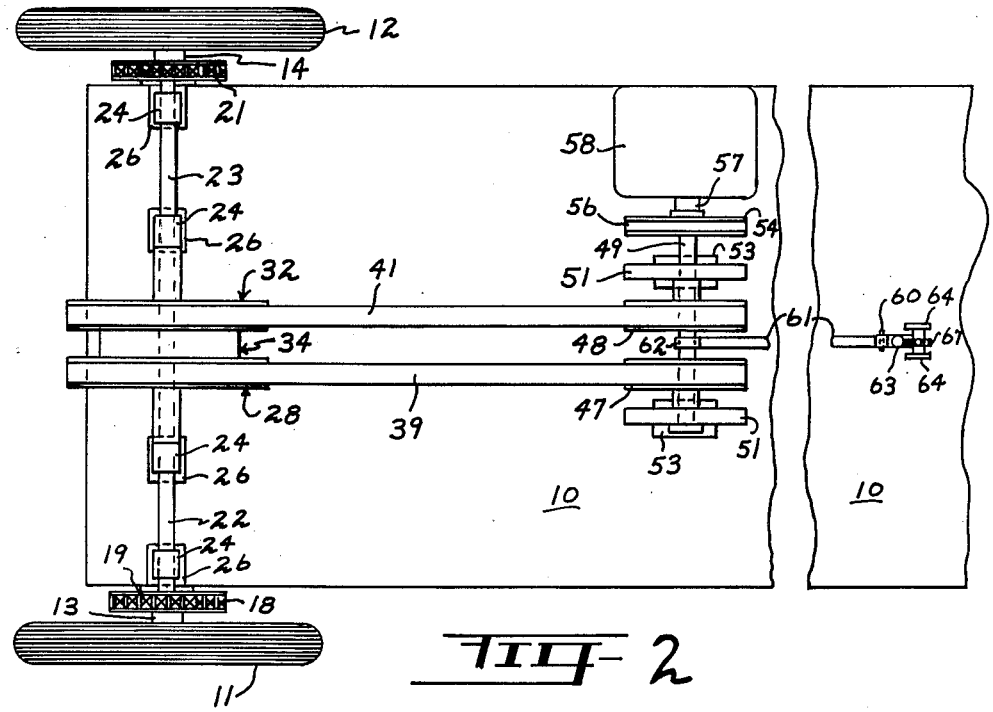
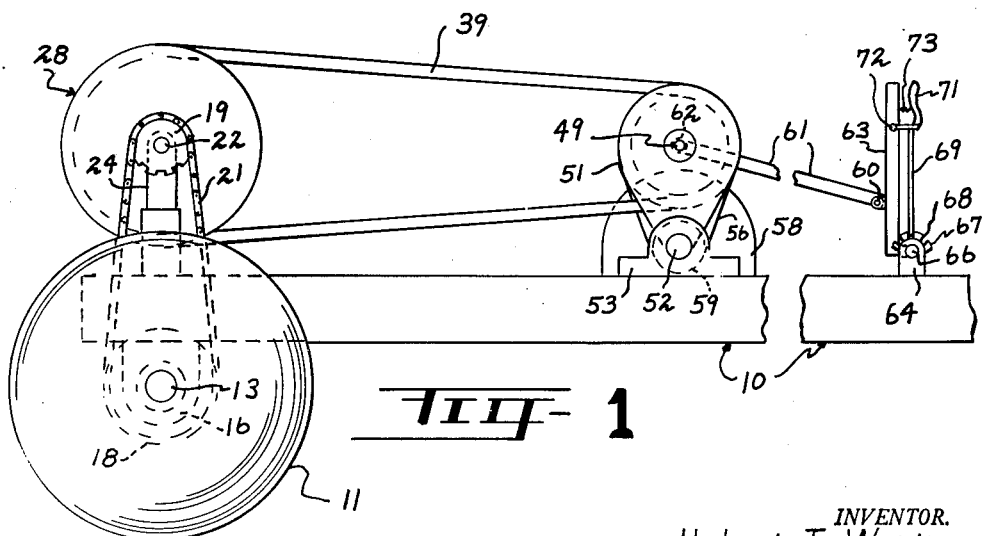
INVENTOR.
Hubert T. Watkins
BY
Jennings, Carter & Thompson
Attorneys

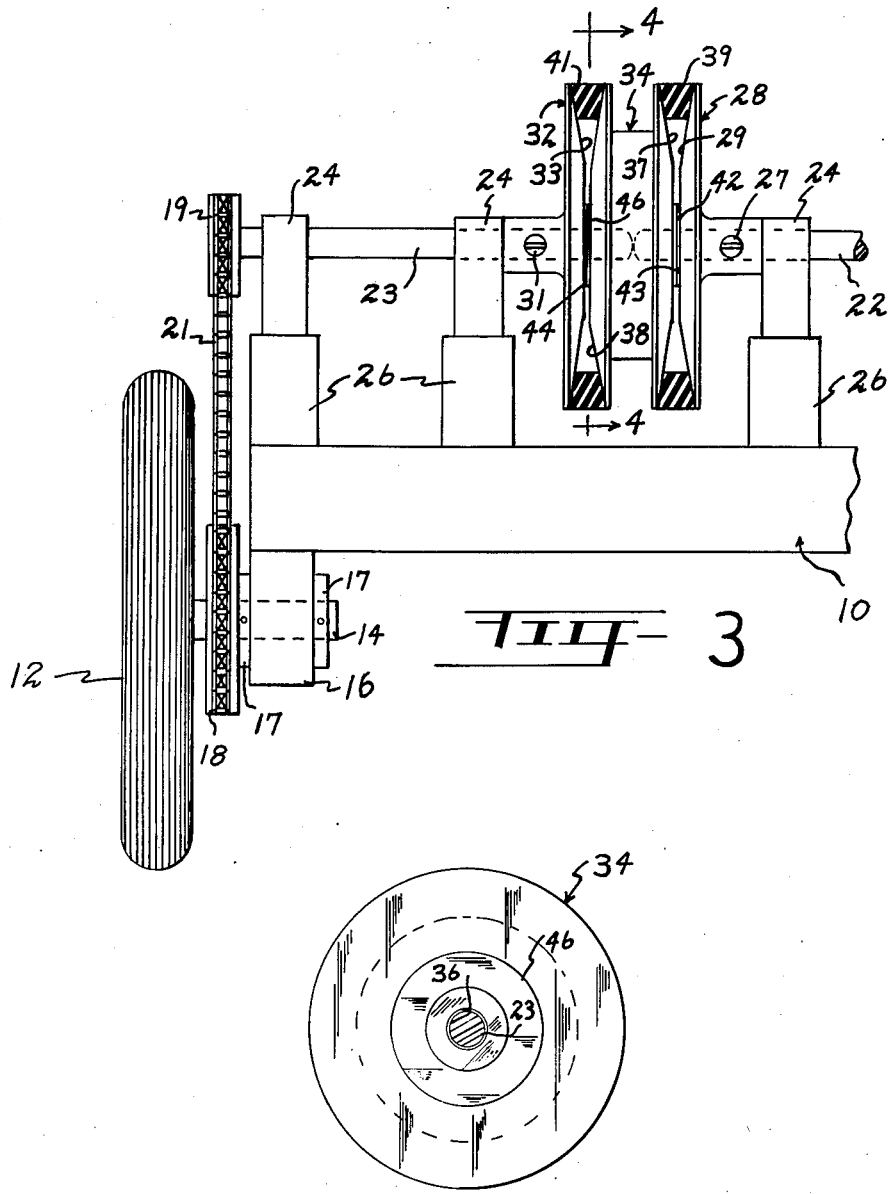

United States Patent Office 3,037,394
Patented June 5, 1962

3,037,394
V-BELT DRIVE
Hubert T. Watkins, 209 W. 2nd St., Little Rock, Ark.
Filed Feb. 23, 1960, Ser. No. 10,163
6 Claims. (Cl. 74—230.17)

This invention relates to a V-belt drive for transmitting power from one rotary member to another and has for an object the provision of such a drive which shall provide a smooth, positive flow of power from a drive member to a driven member, thereby providing quick pick-up in the transmission of power without the usual jerks and grabs associated with conventional V-belt power transmissions.

A more specific object of my invention is to provide a V-belt drive of the character designated which is adapted for use both as a clutch and as a differential.

A still further object of my invention is to provide a V-belt drive of the character designated which shall be simple of construction, economical of manufacture and one which is particularly adapted for use with various types of motorized units, such as small motor cars, lawn mowers, cultivators, tractors and the like.

Heretofore in the art to which my invention relates, various V-belt drives have been provided. However, so far as I am aware, the elements of the V-belt drive have been adapted for axial movement along the shaft supporting the same whereby there is a variable speed transmission rather than a clutch and differential drive. Also, conventional type differentials require heavy housings, expensive gears and the like. To overcome these and other difficulties, I provide a simple pulley arrangement whereby one element of the pulley is rigidly mounted on a rotary member while a second element is adapted for free rotation on the rotary member but is held against axial movement thereon. In order to provide both a clutch and differential drive, a pair of aligned shafts are mounted for rotation with their ends abutting each other. An element of a pulley is secured to each of the abutting shafts while a centrally disposed pulley element is mounted for free rotation on the abutting ends between the fixedly mounted pulley elements whereby the unit operates both as a clutch and as a differential drive.

Apparatus embodying features of my invention is illustrated in the accompanying drawings, forming a part of this application, in which:

FIG. 1 is a side elevational view, partly broken away, showing my improved V-belt drive associated with a translatable frame;

FIG. 2 is a plan view of the apparatus shown in FIG. 1, partly broken away;

FIG. 3 is an enlarged rear elevational view, partly broken away and in section; and, FIG. 4 is a view taken generally along the line 4—4 of FIG. 3.

Referring now to the drawings for a better understanding of my invention, I show a translatable frame indicated generally at 10, having drive wheels 11 and 12 which are secured non-rotatably to shafts 13 and 14, respectively. As shown in FIG. 3, the shafts 13 and 14 are mounted for rotation in suitable bearings 16 and the shafts are held against axial movement relative to the bearings 16 by suitable collars 17.

Mounted non-rotatably on the shafts 13 and 14 are sprockets 18 which are operatively connected to sprockets 19 by a sprocket chain 21. The sprocket 19 which is operatively connected to the drive wheel 11 is mounted non-rotatably on a shaft 22 while the sprocket 19 which is operatively connected to the drive wheel 12 is mounted non-rotatably on a shaft 23. The shafts 22 and 23 are supported for rotation in suitable bearings 24 which are mounted on support members 26 carried by the frame 10. As clearly shown in FIG. 3, the shafts 22 and 23 are in alignment with each other and the adjacent end portions thereof abut whereby the shafts are adapted for independent rotation.

Secured rigidly to the shaft 22 by any suitable means, such as by a set screw 27, is an annular member 28 having an inner surface which flares outwardly as at 29. Mounted non-rotatably on the shaft 23 by suitable means, such as a set screw 31, is an annular member 32 having an inner surface thereon which flares outwardly as at 33. Mounted for free rotation on the abutting ends of the shafts 22 and 23 is an annular member 34. As shown in FIG. 4, the annular member 34 is provided with a suitable opening 36 for receiving the abutting ends of the shafts 22 and 23, whereby the annular member 34 is adapted for free rotation relative to the shafts. The annular member 34 is provided with outer surfaces 37 and 38 which flare outwardly away from the adjacent surfaces 29 and 33 of the annular members 28 and 32, respectively. That is, the surfaces 29 and 37 which flare outwardly away from each other define a pulley groove for receiving a V-belt 39. In like manner, the surfaces 33 and 38 which flare outwardly away from each other define a pulley groove for receiving a V-belt 41.

As shown in FIG. 3, the annular member 28 is provided with a centrally disposed portion 42 which projects outwardly to define a bearing face which is adapted to engage a similar bearing face 43 provided on the annular member 34. That is to say, the outwardly projecting portions 42 and 43 are in alignment with each other and engage each other to provide a bearing face between the annular members 28 and 34. In like manner, the inner face of the annular member 32 is provided with a centrally disposed projection 44 which defines a bearing face which engages a similar face 46 provided on the adjacent surface of the annular member 34. In view of the fact that the annular members 28 and 32 are rigidly secured to the shafts 22 and 23 and the bearing surfaces 42—43 and 44—46 hold the intermediate annular member 34 against axial movement relative to the shafts 22 and 23, the V-belts 39 and 41 do not cause the annular members 28, 32 and 34 to move axially relative to the shafts 22 and 23.

The V-belts 39 and 41 pass around pulleys 47 and 48 which are mounted non-rotatably on a shaft 49. As shown in FIG. 2, the shaft 49 is supported adjacent its ends by vertical plate members 51 which are pivotally supported at their lower ends by a transverse shaft 52. Suitable bearings 53 support the shaft 52, as shown. Mounted non-rotatably adjacent one end of the shaft 49 is a pulley 54. A V-belt 56 surrounds the pulley 54 and is operatively connected to the drive shaft 57 of a motor 58 by a pulley 59, as shown in dotted lines in FIG. 1.

The shaft 49 carrying the pulleys 47 and 48 is moved toward and away from the shafts 22 and 23 by any suitable means, such as by an operating arm 61 having a bearing sleeve 62 thereon which surrounds the shaft 49, as shown in FIG. 2. The other end of the operating arm 61 is pivotally connected by a pin 60 to a lever arm 63 which is pivotally mounted at its lower end to brackets 64 by a pin 66. The lever arm 63 is held at selected positions by providing an arcuate bracket 67 between the brackets 64 having suitable notches 68 therein for receiving a locking element 69. The locking element 69 is pivotally connected to a suitable handle member 71 which in turn is pivotally mounted on the lever arm 63 as at 72. The handle 71 is urged away from the lever arm 63 by a suitable spring 73 whereby the locking member 69 is urged into selected ones of the recesses 68. Accordingly, by releasing the locking member and moving the operating lever 63, the shaft 49 is moved to selected positions relative to the shafts 22 and 23.

From the foregoing description, the operation of my improved apparatus will be readily understood. With the shaft 49 operatively connected to the motor 58, the V-belts 39 and 41 are driven by the pulleys 47 and 48 when the shaft 49 is pulled away from the shafts 22 and 23 to exert the necessary tension on the V-belts. On other hand, when the lever arm 63 is moved toward the shafts 22 and 23, the V-belts 39 and 41 are slackened whereby the shafts 22 and 23 are not driven. That is, the shaft 49, together with the vertical plates 51 rock about the shaft 52 when the lever arm 63 is moved to position the pulleys 47 and 48 at selected positions relative to the shaft 22 and 23.

To start rotation of the shafts 22 and 23, the operating lever 63 is moved to a position whereby the shaft 49 is moved away from the shafts 22 and 23 a sufficient distance to apply the necessary tension on the V-belts 39 and 41. As the V-belts 39 and 41 begin to tighten, the intermediate annular member 34 begins to rotate relative to the adjacent annular members 28 and 32. That is, the V-belts 39 and 41 slip relative to the surfaces 29 and 33 of the annular members 28 and 32, respectively. As the pressure increases, the outer annular members 28 and 32 begin to rotate slowly and then gradually pick up speed until the annular members 28 and 32 are rotating at the same speed as the annular member 34. The slippage action between the V-belts and the adjacent surfaces 29 and 33 provides an effective clutch whereby power is gradually transmitted from the motor 58 to the shafts 22 and 23 whereby the drive wheels 11 and 12 are in turn rotated.

By providing shafts 22 and 23 which are adapted for independent rotation relative to each other, the device also acts as a differential. That is, the clutch feature is only effective at the beginning of the power application while the differential action is applied when a variation in speed of the wheels is necessary. Accordingly, as the wheels are rounding a curve, the outside wheel travels faster than the one on the inside of the curve. That is to say, the V-belt 39 or 41, as the case may be, which drives the wheel on the inside of the curve would slip relative to the adjacent surface 29 or 33, as the case may be, whereby full power is applied to both wheels at all times during operation instead of being applied to only one drive wheel as has heretofore been customary.

From the foregoing, it will be seen that I have devised an improved V-belt drive which brings about a uniform and gradual transmission of power from a prime mover to a driven element. By providing separable pulley elements which are adapted for rotation relative to each other and at the same time providing means limiting axial movement of the pulley elements relative to each other, an effective clutch unit is provided with a minimum of parts. Also, by providing abutting shafts which are adapted for independent rotation relative to each other, together with separate clutch elements operatively connected to each of the shafts, an improved differential action is obtained without the necessity of having to employ heavy and expensive housings and gears.

While I have shown the shaft 49 as being moved toward and away from the shafts 22 and 23 by an operating arm operatively connected to the shaft, it will be apparent that other suitable means may be provided, such as by attaching an operating lever to the vertical plates 51. Also, while I show the shafts 13 and 14 as being short stub axles, it will be apparent that a single shaft 14 could be employed by securing the sprocket 18 to the drive wheel and in turn mounting the drive wheel for rotation on the shaft. Also, while I show the annular members 28, 32 and 34 as being mounted on shafts 22 and 23 which in turn are operatively connected to the driving axles for the wheels, it will be apparent that the annular members could be mounted directly on a pair of abutting driving axles for the wheels. In other words, the shafts 22 and 23 could be lowered on the frame 10 and the wheels 11 and 12 mounted directly thereon.

While I have shown my invention in but one form, it will be obvious to those skilled in the art that it is not so limited but is susceptible of various changes and modifications without departing from the spirit thereof and I desire, therefore, that only such limitations shall be placed thereupon as are specifically set forth in the appended claims.

What I claim is:

1. In a V-belt drive for a pair of axially aligned rotary members, a pair of annular members with each of said members being rigidly secured to separate ones of said rotary members in spaced relationship to each other with the sides of said annular members facing each other flaring outwardly away from each other, a third annular member mounted for free rotation on said rotatable members between said pair of annular members and having outer surfaces thereon which flare outwardly away from the adjacent surfaces on said pair of annular members to define therewith a pair of V-belt receiving pulley grooves, and means holding said third annular member against axial movement along said rotary members.

2. In a V-belt drive for a pair of rotary members as defined in claim 1 which the rotary members comprise a pair of axially aligned shafts having ends which abut within the confines of said third annular member.

3. A V-belt drive comprising a pair of aligned rotary members having abutting end portions, a first annular member mounted non-rotatably on one rotary member adjacent the abutting end portion thereon, a second annular member mounted non-rotatably on the other rotary member adjacent the abutting end portion thereon, the sides of said first and second annular members facing each other being flared outwardly away from each other, a third annular member mounted for free rotation on said abutting end portions between said first and second annular members and having outer surfaces thereon which flare outwardly away from the adjacent surfaces on said first and second annular members to define therewith a pair of V-belt receiving pulley grooves, and means holding said annular members against axial movement along said rotary members.

4. A V-belt drive as defined in claim 3 in which the sides of the annular members which have the outwardly flaring surfaces thereon are provided with centrally disposed portions which project outwardly to define bearing faces between said annular members.

5. A V-belt drive as defined in claim 3 in which the rotary members are aligned shafts which abut each other within the confines of said third rotary member, and the first and second annular members are rigidly secured to said shafts.

6. A V-belt drive as defined in claim 3 in which the third annular member is substantially thicker than said first and second annular member for receiving the abutting ends of said rotary members.

References Cited in the file of this patent

UNITED STATES PATENTS

| | | |
|---|---|---|
| 1,129,366 | Spangler | Feb. 23, 1915 |
| 2,191,531 | Judelshon | Feb. 27, 1940 |
| 2,235,122 | Shaw | Mar. 18, 1941 |
| 2,491,464 | Hazen | Dec. 20, 1949 |
| 2,591,746 | Tom | Apr. 8, 1952 |
| 2,623,400 | Davis | Dec. 30, 1952 |
| 2,778,437 | Robinson et al. | Jan. 22, 1957 |
| 2,882,753 | Pakosh | Apr. 21, 1959 |
| 2,967,435 | James | Jan. 10, 1961 |

FOREIGN PATENTS

| | | |
|---|---|---|
| 358,309 | France | Oct. 6, 1905 |
| 495,864 | Great Britain | 1938 |